Figure 1:
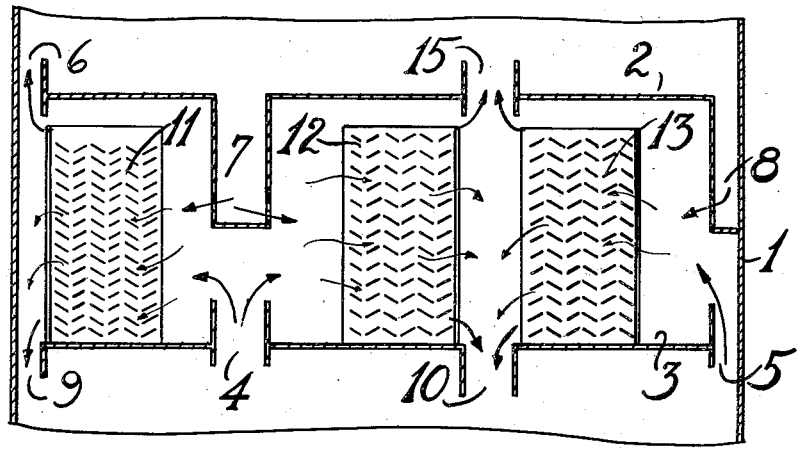

Jan. 27, 1942.  R. F. PFENNIG  2,271,462

COUNTERCURRENT EXTRACTION APPARATUS

Filed July 22, 1939

Reuben F. Pfennig Inventor
By  Small  Attorney

Patented Jan. 27, 1942

2,271,462

UNITED STATES PATENT OFFICE 2,271,462

COUNTERCURRENT EXTRACTION APPARATUS

Reuben F. Pfennig, Baytown, Tex., assignor to Standard Oil Development Company, a corporation of Delaware Application July 22, 1939, Serial No. 285,877

3 Claims. (Cl. 23—270.5)

The present invention relates to the solvent treatment of oil, especially mineral oils. The invention is particularly concerned with a novel precipitating structure adapted for utilization between a series of plates or equivalent means in a countercurrent solvent treating system. The apparatus of the present invention comprises a series of columns of parallel surface elements disposed within said treating system. The columns of parallel surface elements are so arranged to form precipitating units consisting of two columns of flat parallel surface elements per precipitating unit, each column being a half unit. The mechanical structure of the present invention collects dispersed droplets of the respective counter currently flowing phases and allows them to combine with the homogeneous phases without disturbance sufficient in magnitude to cause remixing, thus securing marked improvement in the efficiency of the solvent treating operation.

It is known in the art to treat vegetable, animal, and mineral oils, particularly petroleum oils, with various selective solvents in order to separate the oils into their relatively more aromatic or hydrogen-poor fractions and into their relatively more paraffinic or hydrogen-rich fractions. In these processes, solvents of the class which have a preferential selectivity for the more aromatic type compounds are usually employed, as for example, phenol, furfural, sulfur dioxide, cresol, nitrobenzene, aniline, beta beta dichlor diethyl ether, and the like, as well as solvent mixtures of these materials. It is also known to use, in combination with these solvents, substances which have the ability to modify the selectivity and solvent power of the selective solvent, as for example, substances such as liquefied normally gaseous hydrocarbons, water, alcohols, glycols, and the like.

Although a batch or semi-batch operation is entirely satisfactory, the usual commercial practice is to contact the oil and solvent in a countercurrent tower treating process. In this operation the heavier phase, usually the solvent, is introduced into the top section of a countercurrent treating tower, while the lighter phase, usually the oil, is introduced into the bottom or center portion of the tower. These phases flow in a countercurrent relationship. Temperature and pressure conditions are so adjusted to form a solvent-poor or raffinate phase highly paraffinic in nature and a solvent-rich or solvent extract phase highly aromatic in nature. The respective phases are separated and the solvent is usually removed from the extract and raffinate respectively by distillation. Contact between the respective oil and solvent phase in the countercurrent solvent treating tower is secured by various contacting and distributing means such as packed masses, pierced plates, distributing trays, and the like. The design and character of the means adapted to secure efficient contact between the respective phases are quite important since the efficiency of the entire solvent treating operation is, to a large extent, a function of the contact secured between the respective phases. Contact masses have not been entirely satisfactory since channeling readily occurs. Distributing trays separating respective stages have the disadvantage that it is rather difficult in certain operations to separate the respective countercurrently flowing phases which have been extensively intermixed. Since the efficiency and capacity of a countercurrent solvent treating tower depend, to a large extent, upon the rapidity of separation of these highly intermixed phases, it is very desirable that a clear separation occur in a minimum time. I have now discovered a precipitating structure adapted to be utilized between the distributing plates in a countercurrent treating tower which will result in greater efficiency of the solvent treating operation, and which will materially increase the capacity of the equipment. My invention may be readily understood by reference to the attached drawing illustrating one modification of the same.

Figure 2:
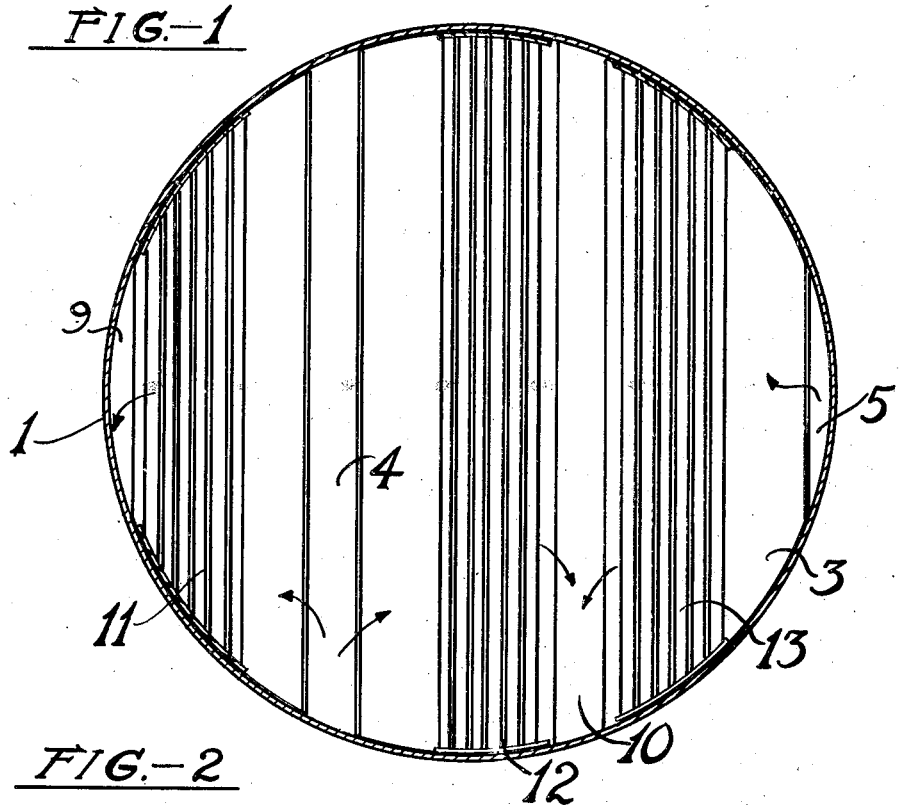

Figure 1 represents a cross section of a countercurrent solvent treating tower, comprising two distributing plates 2 and 3. Figure 2 represents a top view of the lower plate 3 taken from above the precipitating structures 11, 12, and 13. Referring specifically to Figure 1, I represents the outer shell of a countercurrent solvent treating tower. Elements 2 and 3 represent distributing plates maintained within said countercurrent treating tower separating respective stages. Chimneys 4 and 5 permit the upflowing phase to leave the stage below plate 3 and enter the stage between plates 2 and 3, while chimneys 15 and 6 permit the upflowing phase to leave the stage between plates 2 and 3 and enter the stage above plate 2. Walls 7 and 8 permit the downflowing phase to leave the stage above plate 2 and enter the stage between plates 2 and 3, while wells 9 and 10 permit the downflowing phase to leave the stage between plates 2 and 3 and enter the stage below plate 3. Precipitating structures 11, 12, and 13 are arranged in parallel. Each structure consists of a series of three precipitating units. Each precipitating unit consists of two vertical columns of parallel surface elements arranged in a manner to form a trough-like upright or inverted surface structure having an aperture in the bottom or top of the same.

Referring specifically to Figure 2, 1 represents the outside structure of the countercurrent solvent treating tower. Downflow wells of plate 3 are represented by 9 and 10. Upflow chimneys of plate 3 are represented as 4 and 5, while 11, 12, and 13 are top views of the respective precipitating structures, consisting of three precipitating units each.

In an operation in which a solvent such as phenol be employed in the solvent treatment of a petroleum oil, the solvent being the heavier phase would be introduced into the top of the countercurrent treating tower. The down-flowing solvent would settle upon plate 2 and flow into wells 7 and 8, said wells preferably having perforated walls. The solvent from wells 7 and 8 would be jetted into streams of the oil phase ascending through chimneys 4 and 5 in plate 3. Complete mixing would be secured in the zones between well 7 and chimney 4 and between well 8 and chimney 5, resulting in the complete intermixing of the respective phases and probably resulting in the formation of emulsions. The mixed phases are then passed through precipitating structures 11, 12, and 13, so that the downflowing phase leaves the stage between plates 2 and 3 by means of wells 9 and 10, and that the upflowing phase leaves said stage by means of chimneys 6 and 15. Interposed in the lines of flow of the mixed phases and at or near the points where the respective phases leave the stage in question are placed the precipitating structures of the present invention. These precipitating structures comprise one or more precipitating units consisting of two vertical columns of parallel surface elements so arranged that the two intermixed phases coalesce on said surface elements and flow with minimum disturbance into the settled layers of their respective phases.

The apparatus of the present invention may be widely varied. Although Figure 1 illustrates three precipitating structures each comprising three precipitating or coalescing units, it is to be understood that any number of coalescing units with or without an extra half unit may be employed. The number employed will depend upon the size of the treating tower and upon the area of the individual surface elements. In general, it is preferred to employ from three to six precipitating units per precipitating structure. The number of precipitating structures employed is a function of the number of upflow chimneys and downflow wells used to permit the respective phases to move from stage to stage. In general, sufficient precipitating structures are employed so that the highly intermixed phases will have to pass through a precipitating structure before leaving the stage in question.

The number of parallel surfaces employed in each column will depend on the distance between the respective surface elements and also on the distance between the distributing plates separating the various stages, as well as upon the viscosity of the respective phases and the character of the operation being conducted. In general, the parallel surface elements are from one-half to two inches apart and a sufficient number of surface elements employed so that the height of the vertical column of parallel surfaces extends from the surface of a plate below to substantially above the outlets of the wells in the plate above.

The aperture at the apex of the angles formed by the respective parallel surfaces of two vertical columns likewise varies considerably. In general, this aperture varies from one-half to two inches in width and may extend the entire length of the parallel surfaces.

Two columns of parallel surfaces are so arranged with respect to each other that the highly intermixed phases from the mixing zones may be separated at a reasonable rate. They are arranged so that the two phases coalesce on the surface without excessive subsequent mixing and so that the partially collected dispersed phases may flow with minimum disturbance into the settled layers of the same material. It has been found that desirable results are secured if two columns of parallel surfaces are so arranged that the angle between their respective surface elements is in the range from about 75 to 150 degrees.

The type of surface used will depend, to a large extent, on the general construction of the tower. In general, a flat surface element is preferred. The overall length will be of sufficient magnitude so that it may be readily welded or attached to the side of the tower. The thickness of the surface may be of any desired amount in order to secure wearing qualities and will depend, to a large extent, on the particular material being used. The width of the surface is a more important feature and will depend on the size of the tower, the number of precipitating units used, as well as on the character of the solvent and oil being treated. In general, the width of the surface elements should be in the range from two to eight inches, preferably from about four to six inches.

A number of interrelated factors influence the design of the precipitating structure for optimum performance. Among such factors are: (1) the viscosities of the two phases to be separated, (2) the difference between the specific gravities of the two phases, (3) the intimacy of dispersion of the phases, and (4) the rate of settling required. In general, the more viscous the two phases, the more total effective surface will be required. Furthermore, the spacing between the surface elements should increase with more viscous stocks in order to secure an optimum design. Similarly, small gravity differentials or increased dispersion between phases favor the use of more surface elements with greater pitch and sometimes closer spacing. On the other hand, high velocities and high settling rates usually require more total surface of lower pitch.

In order to further illustrate the invention, the following example is given which should not be construed as limiting the same in any manner whatsoever:

Example

A solvent treating tower twelve feet in diameter and containing fourteen plates two feet apart is constructed in a manner so that there are two upflow chimneys, two downflow wells, and three precipitating structures in and on each plate, said chimneys, wells and precipitating structures being parallel and extending across each plate as parallel chords of a circle. The arrangement of the chimneys, wells, and precipitating structures relative to one another on each plate is as described in connection with Figure 1. The wells, chimneys, and precipitating structures are so designed relative to each other that the effective unit areas of the precipitating structures cause separation of substantially equal volumes of the dispersed phases.

Each coalescent structure on a given distributing plate is composed of 90 precipitating surface elements; said elements having a width of two inches, a thickness sufficient to maintain rigidity and a length sufficient to permit welding both ends of each element to the encircling wall of the tower. The precipitating elements, which lengthwise are horizontal but breadthwise are inclined at an angle of 30° with respect to the given distributing plate, are arranged in six parallel, vertical columns separated by apertures of one-eighth inch. Each column contains fifteen precipitating surface elements spaced at one and one-half inch intervals; said elements being parallel to each other in a given column but transverse to those in adjacent columns.

In the operation of the tower, anhydrous phenol or aqueous phenol (containing approximately 3% water) is introduced on the fourteenth plate, the oil feed is introduced on the fourth plate, and additional water in amounts up to 4%, based on the phenol, is introduced below the first plate in the bottom of the tower. As the oil and phenol pass countercurrent to one another through the tower, the phenol dissolves the more aromatic constituents of the oil and carries them to the bottom of the tower where the injected water causes the less aromatic constituents that have dissolved in the phenol to be precipitated, thereby setting up oil reflux in the bottom of the tower. The phenol phase (phenol plus dissolved oil and water) is withdrawn at the bottom of the tower and the oil phase is withdrawn at the top of the tower.

Capacity studies of this tower and of similar towers equipped with precipitating structures of various other designs (not described) are given in Table 2. The properties of the feed stocks employed are as follows:

TABLE 1

Tests on charge stocks

| | Oil A | Oil B |
|---|---|---|
| Gravity, °A. P. I. | 21.7 | 21.5 |
| Flash, °F. | 395 | 385 |
| Fire, °F. | 445 | 445 |
| Viscosity at 100° F. | 474 | 459 |
| Viscosity at 210° F. | 54.6 | 52.7 |
| Viscosity index | 36.0 | 26.0 |
| Viscosity at 180° F. (Extrapolated) | 71.8 | 70.5 |

TABLE 2

Capacities of solvent treating towers

| Precipitating structure in tower | Oil feed stock | Feed rates, bbls. per day - Oil | Feed rates, bbls. per day - Phenol | Ratio: phenol/Oil | Treating temp., °F. | Percent raffinate in extract | Ave. vel. of total oil plus phenol through unit cross-section area of precipitating structure on 14th plate, gals./hr./sq. ft. |
|---|---|---|---|---|---|---|---|
| Present invention | Oil B | 7,200 | 12,000 | 1.67 | 180 | 2.0 | 633 |
| A1 | Oil A | 6,900 | 12,800 | 1.86 | 120 | Excessive | 652 |
| A2 | Oil A | 5,400 | 9,500 | 1.76 | 120 | Excessive | 564 |
| A3 | Oil A | 4,400 | 7,700 | 1.75 | 120 | 6.0 | 405 |
| B | Oil A | 5,400 | 9,500 | 1.76 | 120 | Excessive | 564 |
| C1 | Oil B | 7,200 | 12,000 | 1.67 | 180 | Excessive | 633 |
| C2 | Oil B | 5,000 | 8,100 | 1.62 | 180 | 9.0 | 435 |
| D1 | Oil B | 7,200 | 12,000 | 1.67 | 180 | Excessive | 633 |
| D2 | Oil B | 5,000 | 8,100 | 1.62 | 180 | 9.0 | 435 |
| E1 | Oil B | 7,200 | 12,000 | 1.67 | 180 | Excessive | 633 |
| E2 | Oil B | 6,000 | 10,000 | 1.67 | 180 | Excessive | 537 |
| E3 | Oil B | 5,000 | 8,100 | 1.62 | 180 | 3.0 | 435 |
| F | Oil B | 5,000 | 8,100 | 1.62 | 180 | 10.0 | 435 |
| G1 | Oil B | 7,200 | 12,000 | 1.67 | 180 | Excessive | 633 |
| G2 | Oil B | 6,000 | 10,000 | 1.67 | 180 | 7.0 | 537 |
| H1 | Oil B | 6,000 | 10,000 | 1.67 | 180 | 25.0 | 537 |
| H2 | Oil B | 5,000 | 8,100 | 1.62 | 180 | 5.0 | 435 |
| I | Oil B | 5,000 | 8,100 | 1.62 | 180 | 9.0 | 435 |
| J1 | Oil B | 6,000 | 10,000 | 1.67 | 180 | 22.0 | 537 |
| J2 | Oil B | 5,000 | 8,100 | 1.62 | 180 | 4.0 | 435 |
| K1 | Oil B | 6,000 | 10,000 | 1.67 | 180 | 10.0 | 537 |
| K2 | Oil B | 5,000 | 8,100 | 1.62 | 180 | 5.0 | 435 |
| L1 | Oil B | 6,000 | 10,000 | 1.67 | 180 | 4.0 | 537 |
| L2 | Oil B | 5,000 | 8,100 | 1.62 | 150 | 4.5 | 435 |
| L3 | Oil B | 5,000 | 8,100 | 1.62 | 130 | 7.0 | 435 |
| M | Oil B | 5,000 | 8,100 | 1.62 | 180 | 8.5 | 435 |
| N1 | Oil B | 7,200 | 12,000 | 1.67 | 180 | 16.2 | 633 |
| N2 | Oil B | 6,000 | 10,000 | 1.67 | 180 | 13.6 | 537 |
| N3 | Oil B | 5,000 | 8,100 | 1.62 | 180 | 3.5 | 435 |
| O1 | Oil B | 7,000 | 12,000 | 1.71 | 180 | 22.0 | 633 |
| O2 | Oil B | 6,000 | 10,000 | 1.67 | 180 | 20.0 | 537 |

From the above data it is apparent that marked advantages are secured by the apparatus of the present invention.

The precipitating structure hereinabove described is particularly well adapted for use in the solvent treating of oils. However, it is to be distinctly understood that such a precipitating structure or modifications thereof may be used advantageously in other processes involving separation of two or more fluids having limited miscibilities and different specific gravities.

The present invention is not to be limited by any theory or mode of operation, but only in and by the following claims in which it is desired to claim all novelty in so far as the prior art permits.

I claim:

1. In a solvent treating tower for counter-currently contacting a selective solvent and a liquid containing an extractable component, a plurality of distributing plates, opposing inlet means for said solvent and said liquid in successive plates extending between said plates to a point in sufficient proximity to each other to form a mixing zone therebetween, outlet means for said solvent and said liquid in said plates at a location removed from said inlet openings, a separator structure between said inlet and outlet openings, said separator structure consisting of vertical columns of longitudinally extending plate-like elements, the plates in each column being parallel and inclined to the horizontal and the plates in adjacent columns being oppositely inclined and horizontally aligned.

2. A solvent treating tower according to claim 1 in which the vertical columns extend from the surface of the plate below to substantially above the inlet means.

3. A solvent treating tower according to claim 1 in which the inlet means, outlet means and separator means extend from one side of the tower to the other.

REUBEN F. PFENNIG.